Sept. 29, 1953 E. M. SPLAINE 2,653,514
OPHTHALMIC MOUNTING
Filed Dec. 22, 1950
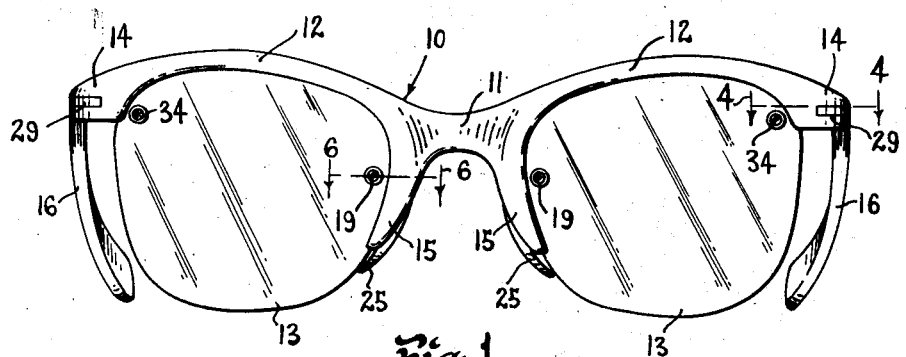
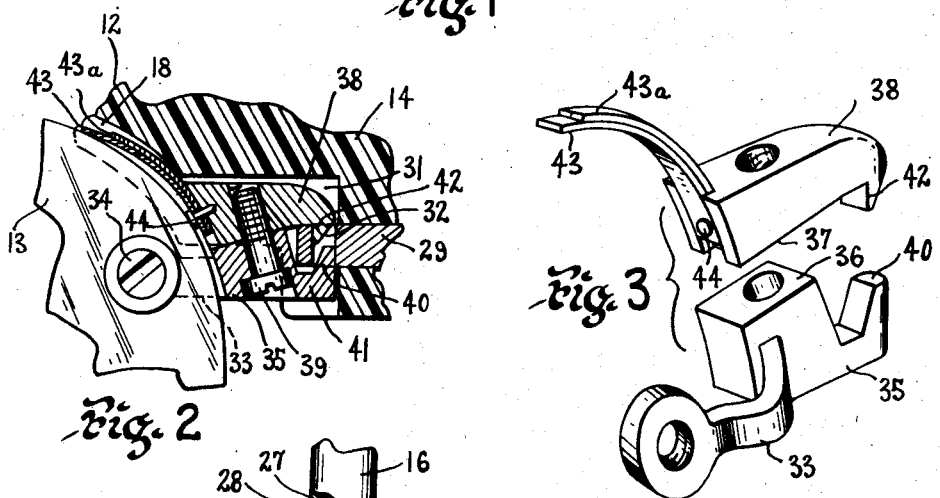
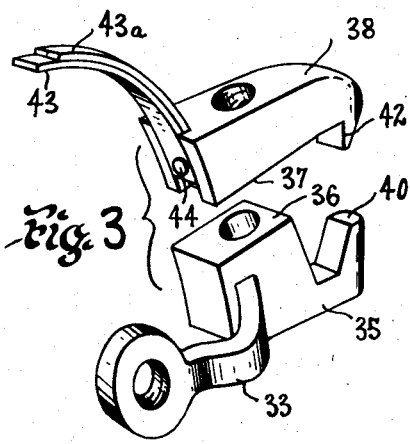
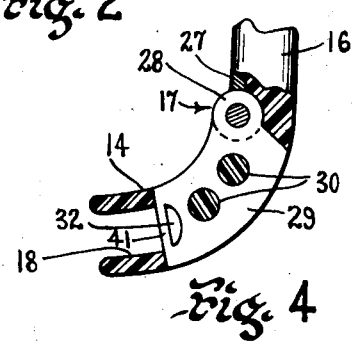
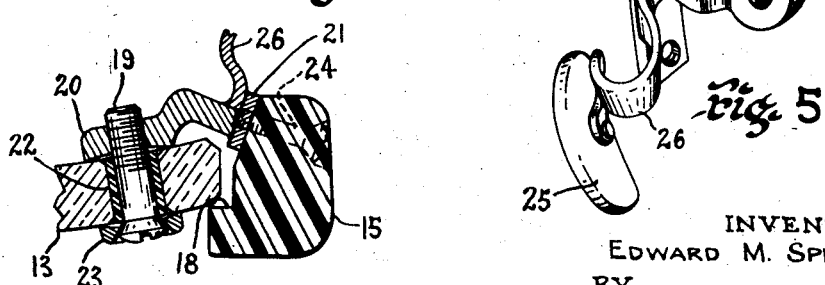
INVENTOR
EDWARD M. SPLAINE
BY
Louis L. Gagnon
ATTORNEY Patented Sept. 29, 1953

2,653,514

UNITED STATES PATENT OFFICE 2,653,514

OPHTHALMIC MOUNTING

Edward M. Splaine, Southbridge, Mass., assignor to American Optical Company, Southbridge, Mass., a voluntary association of Massachusetts Application December 22, 1950, Serial No. 202,339

9 Claims. (Cl. 88—47)

This invention relates to improvements in ophthalmic mountings and has particular reference to improvements in mountings of the semi-rimless type and to the provision of novel and efficient means for securing the lens therein.

One of the principal objects of this invention is the provision of an ophthalmic mounting embodying a lens supporting structure comprising lens supporting arms extending outwardly and downwardly from a bridge and adapted to extend along the upper contour edge and nasal edge of a pair of respective lenses, the lenses being secured to said arms by novel means of an inconspicuous and efficient nature whereby the lenses are detachably and yieldably retained in their desired positional relation with the lens supporting arms.

Another object is the provision of an ophthalmic mounting of the above character wherein the means for connecting each of the lenses to the respective lens supporting arms in the nasal regions of the structure embodies a plate member fixedly secured directly to the arm and having a lens supporting strap fixedly secured thereto and connected to the lens, and the means for connecting each of the lenses to the respective lens supporting arms in the temporal regions of the structure embodies a pair of superimposed block members which are removably connected to a portion of the arm, one of said blocks having a lens strap fixedly secured thereto and connected to the lens, the other of said blocks having a spring device connected thereto and engaging the adjacent contour edge of the lens for constantly urging the lens toward the arm and to also function as resilient buffer means to absorb shock to which the lens may be subjected.

Another object is to provide an ophthalmic mounting of the above character embodying improved lens supporting means whereby the lenses may be easily and quickly attached to or removed from said supporting means.

Still another object is to provide a device of the above character which is attractive in appearance, efficient in its use, comparatively simple in its construction, readily assembled, and relatively inexpensive to manufacture.

Other objects and advantages of the invention will become apparent from the following description taken in connection with the accompanying drawing, wherein Fig. 1 is a front elevation of an ophthalmic mounting embodying the invention;

Fig. 2 is a fragmentary sectional view of the temporal lens connecting means;

Fig. 3 is an exploded perspective view of the parts of the temporal lens connecting device;

Fig. 4 is a fragmentary sectional view taken on line 4—4 of Fig. 1 and looking in the direction of the arrows;

Fig. 5 is a perspective view of the nasal lens connecting device; and

Fig. 6 is a fragmentary sectional view taken on line 6—6 of Fig. 1 looking in the direction of the arrows.

Referring more particularly to the drawing wherein like characters of reference designate like parts throughout the several views, the device embodying the invention, as illustrated in Fig. 1, comprises broadly a lens supporting structure or front 10 consisting of a central bridge member 11 having transverse lens supporting arms 12 extending outwardly therefrom and shaped substantially to follow the upper contour edges of respective lenses 13 to be supported thereby and terminating in temple supporting end portions 14 which are adapted to extend slightly beyond the edge of the lenses at the temporal regions thereof. The bridge member 11 also has depending portions or arms 15 shaped substantially to follow the adjacent nasal contour edges of the lenses 13.

The end portions 14 have suitable temples or sides 16 pivotally attached thereto as at 17 (Fig. 4), the end portions 14 extending outwardly and rearwardly of the temporal ends of the transverse lens supporting arms 12 at a location above and at one side of the useful field of vision and, therefore, not obstructing the vision of the wearer when the mounting is in position of use.

The complete lens supporting structure 10 including the bridge member 11, transverse arms 12, depending arms 15 and temples 16 are preferably formed of light weight non-metallic material such as zylonite, Celluloid, Bakelite, or other artificial material. It is to be understood, however, that the said parts may be formed of any of the known so-called plastic materials or any light weight metallic material such as aluminum or the like. The said parts, however, are preferably formed of materials having the characteristics of artificial resins which possess a relatively non-inflammable, acid-resisting nature, and which tend to be less subject to deformation from their original shapes due to changes in atmospheric or other conditions to which they may be subjected. Such materials are also exceedingly light in weight and are readily moldable or otherwise workable, and the parts composed thereof may be made to any desired color or colors.

The surfaces of the transverse arms 12, adjacent depending arms 15 and end portions 14 adjacent the lenses 13 are provided with a continuous channel 18 in which are adapted to be located the adjacent contour edges of the lenses 13.

The lenses 13 are each pierced adjacent their nasal edges for reception of a screw 19 or similar means for connecting the lens to a lens strap 20 (Figs. 5 and 6) which overlies the rear surface of the lens 13 and is fixedly connected as by soldering or the like to a supporting plate 21. The screw 19 may, if desired, extend through a bushing 22 located in the lens opening with the head of the screw engaging a washer 23 which is shaped to engage the lens surface in a continuous circular area encircling the lens opening. Such construction aids in preventing breakage of lenses. The supporting plates 21 are located in recesses provided therefor in the depending arms 15, the recesses being preferably formed by removing portions of the rear walls of the channels 18. The bottoms of the recesses are preferably angled slightly as shown clearly in Fig. 6 so as to converge inwardly toward the nose whereby screws 24 or similar connecting means may be easily inserted into the supporting plates 21 through the depending arms 15 for securing the plates 21 to the arms 15.

Nose pads 25 are also carried by the supporting plates 21 and are adapted to be connected thereto by guard arms 26, which are preferably attached as by solder to the plates 21 adjacent the lens straps 20.

The temples 16 are hingedly connected to the end portions 14. The hinge construction comprises a hinge plate 27 (Fig. 4) secured to the inner surface of the temple 16 and having a pair of spaced ears (not shown) between which is adapted to be located an ear 28 forming a part of a plate 29 which is embedded in the material of the end portion 14 (Figs. 1, 2 and 4) and secured therein as by pins or plugs 30 preferably formed of a material similar to the material of the end portion 14. The end of the plate 29 which is directed toward the lens 13 extends outwardly of the material into an enlarged portion 31 of the channel 18 and has an opening 32 therethrough adjacent said end.

The lenses 13 are connected in their temporal regions to respective lens straps 33 as by screws 34 or the like similar to the nasal connections. Each of the lens straps 33 is adapted to overlie the rear surface of the lens 13 and is fixedly attached as by solder or the like to the rear surface of a block 35 (Figs. 2 and 3). The block 35 is shaped with an upper surface 36 which is angled slightly upwardly as it progresses in a direction away from the lens 13 and is engaged by a similarly angled lower surface 37 formed on a second block 38 superimposed thereon. The blocks 35 and 38 are adapted to be connected together as by a screw 39 which is angled as shown in Fig. 2 for ease of assembly. The block 35 is provided on its end directed away from the lens 13 with an integral hooked portion 40 which overlies the under surface of the shelf 41 formed by the end of the plate 29 with the end thereof being directed toward the second block 38 and positioned within the opening 32. The adjacent end of the second block 38 is provided with an integral hooked portion 42 which overlies the upper surface of the shelf 41 with the end there- of being also located within the opening 32 and directed toward the end of the hooked portion 40 of the first block 38.

In order that the opening 31 may be kept as small as possible so as not to weaken the structure and also to avoid bulkiness, it is necessary that the hooked portion 42 of the second block 38 be arranged so that it may be easily slipped over the shelf 41 without exertion of force or pressure which might cause damage or breakage. Thus, in the assembled device the blocks 38 and 40 fit about the shelf 41 with the hooked ends thereof interlocking with the opening in said shelf. In order to compensate for possible looseness of fit, spring means is employed for yieldably urging the lens 13 into the channel 18. The said spring may comprise one or more leaf portions 43 which are connected at one end thereof to the end of the second block 38. In the preferred construction shown in Figs. 2 and 3 the spring means each comprise two leaf portions 43 and 43a which are superimposed and normally curved longitudinally. One end of the spring assembly is positioned within a groove provided therefor in the end of the second block 38 adjacent the lens 13 and secured thereto as by a rivet 44. The springs 43 and 43a extend into the channel 18 in the transverse arm 12 and are normally spaced from the adjacent edge of the lens 13. The curvature of the springs, however, is controlled so as to be of shorter radius than the curvature of the adjacent edge of the lens 13. Thus, the spring assembly engages the edge of the lens only at the free end of spring 43 as shown in Fig. 2. The leaf spring 43a is somewhat shorter than spring 43 to aid in providing the desired resiliency.

To illustrate the function of the device, if a lens 13 is forcibly urged in a direction away from the transverse arm 12, for example, the movement of the lens will be that of a tilting about the center of the nasal connection screw 19. Such a movement will cause the temporal side of the lens to exert a downward force on the lens strap connection screw 34. Due to the fact that the second block 38 rests on the top of the shelf 41 and that the block 35 carrying the lens strap 33 is attached to the block 38 the perforated end of the strap will tend to rotate on the screw 34 and cause the block assembly to simultaneously tilt downwardly with respect to the bearing point of the second block on the shelf. This action will cause the spring to flatten and exert a greater resilient force on the edge of the lens.

Upon release of the lens 13, the spring means will, due to its inherent resiliency, tend to revert to its normal curvature, thus causing the parts to return to their normal positions and the contour edge of the lens to again properly reside within the channel 18.

With a construction in accordance with the foregoing description, lenses may be easily assembled with the supporting structure therefor and since the nasal supporting plates 21 and screws 24 as well as the temporal screws 39 are angled as described, greater ease is permitted in gaining access to the heads of the screws with a screwdriver when assembling the parts or when interchanging lenses.

It will be seen that in such a construction as herein shown and described, the supporting parts of the mounting are above and out of the useful field of vision of the wearer and the lenses thereof are properly and efficiently yieldably retained in their desired positional relation with said supporting structure.

However, it is to be understood that several changes and modifications may be made and that although the construction herein described as having a bridge member formed with integral transverse arms 12 and depending arms 15, the invention might be used with different types of bridge members, and it is also to be understood that the nose pads may be constructed or attached in various other manners than that shown and described such as by forming them integral with the depending arms 15 or through the use of other known types of lens connection means.

It will be apparent that many changes may be made in the details of construction and arrangement of parts shown and described without departing from the spirit of the invention as expressed in the accompanying claims. Therefore, it is to be understood that all matter set forth or shown in the accompanying drawing is to be interpreted as illustrative and not in a limiting sense.

I claim:

1. A lens supporting structure for the lenses of an ophthalmic mounting, said structure comprising a central bridge member having bar-like members extending outwardly of the opposed sides thereof and shaped substantially to follow the upper contour shape of the lenses to be used therewith, said bar-like members terminating in temple connection end portions having attachment means adjacent said portions, said structure having nasal lens connection means secured thereto adjacent the opposed sides of the bridge and having temporal lens connection means embodying a pair of members each having a portion adapted to straddle the attachment means of the bar-like members adjacent the temple connection end portions, one having a further portion for supporting lens holding means and the other carrying resilient means for yieldably urging against the adjacent lens edge to hold the lens in desired positional relation with the bar-like member and means for moving said members into binding relation with opposed sides of said attachment means.

2. A lens supporting structure for the lenses of an ophthalmic mounting, said structure comprising a central bridge, a pair of arms extending outwardly of said bridge to follow the top edge of said lenses and terminating in temple supporting end portions, said arms each having an enlarged recess adjacent said end portion, a temple hinge plate secured to a respective temple supporting end portion and extending into said enlarged recess therein, holding means adjacent the nasal sides of said bridge and adapted to be connected with the nasal sides of said lenses to be supported, temporal lens connection means comprising a lens strap having one end adapted to be attached to a respective lens to be supported, a connection member attached to the opposed end of said lens strap and disposed within said enlarged recess in the respective arm below the portion of the hinge plate extending into said enlarged recess, and a supporting member positioned above said connection member and portion of the hinge plate extending into said recess, said connection and supporting members being perforated to permit connection means to be extendable therethrough for maintaining said members in joined relation and in gripping engagement with the portion of the hinge plate extending into the recess, and resilient means secured to said temporal lens connection means for yieldably urging said lens, when assembled therewith, toward said arm.

3. A lens supporting structure for the lenses of an ophthalmic mounting, said structure comprising a central bridge, a pair of arms extending outwardly of said bridge to follow the top edge of said lenses and terminating in temporal supporting end portions, said arms each having an enlarged recess adjacent said end portion, a temple hinge plate secured to a respective temple supporting end portion and extending into said enlarged recess therein, holding means adjacent the nasal sides of said bridge and adapted to be connected with the nasal sides of said lenses to be supported, temporal lens connection means comprising a lens strap having one end adapted to be attached to a respective lens to be supported, a connection member attached to the opposed end of said lens strap and disposed within said enlarged recess in the respective arm below the portion of the hinge plate extending into said recess, and a supporting member positioned above said connection member and portion of the hinge plate extended into the recess, said connection and supporting members being perforated to permit connection means to be extendable therethrough for maintaining said members in joined relation and in gripping engagement with the portion of the hinge plate extending into the recess, and resilient means for yieldably urging said lens, when assembled therewith, toward said arm comprising an arcuate leaf spring device having one end secured to said temporal lens connection means, said leaf spring device having a curvature of a radius shorter than the radius of the adjacent contour edge of the lens to be supported and having its free end adapted to be positioned in engagement with said adjacent edge of the lens whereby the inherent resiliency thereof will yieldably retain said lens and arm in desired positional relation when assembled together.

4. An ophthalmic mounting comprising a pair of spaced lenses, a lens supporting structure embodying a central bridge, a pair of arms extending outwardly of said bridge to follow the top edge of said lenses and terminating in temple supporting end portions, said arms each having an enlarged recess adjacent said end portion, temples hingedly connected to said end portions, nose engaging means adjacent the nasal sides of said bridge, a temple hinge plate secured to a respective temple supporting end portion of the arms and extending into said enlarged recess therein, attachment portions carried by the supporting structure adjacent the bridge for connection with the nasal portions of said lenses, and means for attachment of each of said lenses in the temporal areas thereof to said arms comprising a lens strap having one end attached to a respective lens and connection means attached to the opposed end of said lens strap and disposed within said enlarged recess in the respective arm, and a supporting member within said recess above said connection member, said connection means being positioned in straddling and gripping engagement with the portion of said temple hinge plate extending into said recess, said connection and supporting members being perforated to permit joining means to be extendable therethrough for moving said members into gripping engagement with the opposed sides of said temple hinge plate, and resilient means attached to said connection means for yieldably urging said lens toward said arm comprising an arcuate leaf spring device having one end secured to said supporting member, said leaf spring device having a curvature of a radius shorter than the radius of the adjacent contour edge of the lens and positioned with its free end in engagement with said edge of the lens whereby the inherent resiliency thereof will yieldably retain the lens and arm in desired positional relation.

5. A lens supporting structure for the lenses of an ophthalmic mounting, said structure comprising a central bridge member having bar-like members extending outwardly of the opposed sides thereof and shaped substantially to follow the upper contour shape of the lenses to be used therewith, said bar-like members terminating in temple connection end portions having an enlarged recess on their lens edge directed side, and attachment means carried by the respective temple connection end portion extending into said recess formed in said respective temple connection end portion, said structure having a pair of connection members located on opposed sides of the attachment means extending into said recess, and a connecting device adapted to be attached to said members for retaining them in gripping engagement with said attachment means, resilient means carried by the upper one of said members adapted to yieldably urge a respective lens, when assembled therewith, toward a respective bar-like member, and lens holding means carried by the other of said connection members and by means adjacent the bridge for supporting lenses in assembled relation with said structure.

6. A lens supporting structure for the lenses of an ophthalmic mounting, said structure comprising a central bridge member having bar-like members extending outwardly of the opposed sides thereof and shaped substantially to follow the upper contour shape of the lenses to be used therewith, said bar-like members being grooved on their under side to receive the upper edge of a lens and terminating in temple connection end portions having an enlarged recess on their lens edge directed side communicating with said grooved portion of the bar-like members, an attachment plate secured to each of the respective temple connection end portions and having a part thereof extending into said enlarged recess formed in said respective temple connection end portion, said structure having a pair of perforated connection members located on opposed sides of the part of the attachment plate extending into said recess, and pin-like means extendable through said perforations for retaining said connection members in gripping engagement with said part of the attachment plate, lens holding means carried by the lower one of said connection members and by means adjacent the bridge for supporting lenses in assembled relation with said structure, and resilient means carried by the upper one of said connection members for yieldably urging against the edge of a respective lens, when so supported by the holding means to maintain the lens in desired positional relation with a respective bar-like member.

7. A lens supporting structure for the lenses of an ophthalmic mounting, said structure comprising a central bridge member having bar-like members extending outwardly of the opposed sides thereof and shaped substantially to follow the upper contour shape of the lenses to be used therewith, said bar-like members being grooved on their under side to receive the upper edge of a lens and terminating in temple connection end portions having an enlarged recess on their lens-edge-directed side communicating with said grooved portion of the bar-like members, a temple hinge plate secured to each of the respective temple connection end portions and having a part thereof extending into said enlarged recess formed in said respective temple connection end portion, said part having an opening therein, and a pair of perforated connection members located on opposed sides of said part of the hinge plate extending into said recess, the upper one of said connection members having a hooked portion positioned within said opening in said part of the attachment plate extending into the recess, and pin-like means extendable through said perforations for retaining said connection members in gripping engagement with said part of the hinge plate, lens holding means carried by the lower one of said connection members and by means adjacent the bridge for supporting lenses in assembled relation with said structure, and resilient means carried by the upper one of said connection members for yieldably urging against the edge of a respective lens, when so supported by the holding means, to maintain the lens in desired positional relation with a respective bar-like member.

8. A lens supporting structure for the lenses of an ophthalmic mounting, said structure comprising a central bridge member having bar-like members extending outwardly of the opposed sides thereof and shaped substantially to follow the upper contour shape of the lenses to be used therewith, said bar-like members being grooved on their under side to receive the upper edge of a lens and terminating in temple connection end portions having an enlarged recess on their lens-edge-directed side communicating with said grooved portion of the respective bar-like members, a temple hinge plate secured to each of the respective temple connection end portions and having a part thereof extending into said enlarged recess formed in said respective temple connection end portion, said part having an opening therein, and a pair of perforated connection members located on opposed sides of said part of the hinge plate extending into said recess, said connection members having hooked portions positioned within said opening in said part of the attachment plate, and pin-like means extendable through said perforations for retaining said connection members in gripping engagement with said part of the hinge plate, lens holding means carried by the lower one of said connection members and by means adjacent the bridge for supporting lenses in assembled relation with said structure, and resilient means carried by the upper one of said connection members for yieldably urging against the edge of a respective lens, when so supported by the holding means, to maintain the lens in desired positional relation with a respective bar-like member.

9. A lens supporting structure for the lenses of an ophthalmic mounting, said structure comprising a central bridge member having bar-like members extending outwardly of the opposed sides thereof and shaped substantially to follow the upper contour shape of the lenses to be used therewith, said bar-like members being grooved on their under side to receive the upper edge of a lens and terminating in temple connection end portions having an enlarged recess on their lens-edge-directed side communicating with said grooved portion of the bar-like members, a temple hinge plate secured to each of the respective temple connection end portions and having a part thereof extending into said enlarged recess formed in said respective temple connection end portion, said part having an opening therein, a pair of perforated connection members, one having a portion to overlie said part of the hinge plate extending into the recess and the other having a portion to underlie said part and each having an end portion positioned within the opening in said part, one of said end portions being shaped to substantially engage one wall of the opening in said part and the other end portion being shaped to engage the opposed wall of said opening and pin-like means extendable through said perforations for retaining said connection members in said assembled relation with said part of the hinge plate, lens holding means carried by the lower one of said connection members and by means adjacent the bridge for supporting lenses in assembled relation with said structure, and resilient means carried by the upper one of said connection members for yieldably urging against the edge of a respective lens, when so supported by the holding means, to maintain the lens in desired positional relation with a respective bar-like member.

EDWARD M. SPLAINE.

References Cited in the file of this patent

UNITED STATES PATENTS

| Number | Name | Date |
| --- | --- | --- |
| 2,236,304 | Snavely | Mar. 25, 1941 |
| 2,301,328 | Rochte | Nov. 10, 1942 |
| 2,450,711 | Bouchard | Oct. 5, 1948 |
| 2,532,959 | Stegeman | Dec. 5, 1950 |
| 2,552,121 | Splaine | May 8, 1951 |
| 2,553,181 | Gagnon | May 15, 1951 |
| 2,554,386 | Rohrbach | May 22, 1951 |